(12) United States Patent
Hubbard et al.

(10) Patent No.: US 6,825,997 B2
(45) Date of Patent: Nov. 30, 2004

(54) OPTICAL ELEMENT MOUNTING TECHNIQUE

(75) Inventors: William J. Hubbard, Litchfield, NH (US); Kevin J. McIntyre, Derry, NH (US); Andrew Radl, Dunbarton, NH (US); Thomas A. Schaefer, Groveland, MA (US); Ian C. Prees, Chelmsford, MA (US)

(73) Assignee: Confluent Photonics Corporation, Salem, NH (US)

( * ) Notice: Subject to any disclaimer, the term of this patent is extended or adjusted under 35 U.S.C. 154(b) by 0 days.

(21) Appl. No.: 10/390,153

(22) Filed: Mar. 18, 2003

(65) Prior Publication Data

US 2003/0210477 A1 Nov. 13, 2003

Related U.S. Application Data

(60) Provisional application No. 60/364,637, filed on Mar. 18, 2002.

(51) Int. Cl.[7] .............................................. G02B 7/02
(52) U.S. Cl. ..................................................... 359/819
(58) Field of Search ................................ 359/819, 820

(56) References Cited

U.S. PATENT DOCUMENTS

| | | | |
|---|---|---|---|
| 4,147,413 A | * | 4/1979 | Sims et al. ................... 359/820 |
| 5,379,155 A | * | 1/1995 | Goetschmann et al. ...... 359/820 |
| 5,416,867 A | * | 5/1995 | Thorsten et al. ............... 385/73 |
| 5,737,133 A | | 4/1998 | Ouchi et al. |
| 5,751,877 A | | 5/1998 | Ishizaka et al. |
| 6,603,614 B2 | * | 8/2003 | Fulkerson et al. ........... 359/820 |
| 2004/0056096 A1 | * | 3/2004 | Gurevich et al. ............ 235/454 |

FOREIGN PATENT DOCUMENTS

DE    WO 92/15031    *  3/1992    ............ G02B/7/02

OTHER PUBLICATIONS

International Search Report dated Sep. 2, 2003 for Application No. PCT/US03/08222.

* cited by examiner

Primary Examiner—Ricky Mack
(74) Attorney, Agent, or Firm—Hunton & Williams LLP

(57) ABSTRACT

A technique for attaching an optical element to a structural element is disclosed. In one particular exemplary embodiment, the technique may be realized as an apparatus for attaching an optical element to a structural element. Such an apparatus may comprise an optical element formed of a material having a first coefficient of thermal expansion value, a structural element formed of a material having a second coefficient of thermal expansion value, and an intermediate element formed of a material having a third coefficient of thermal expansion value that is between the first coefficient of thermal expansion value and the second coefficient of thermal expansion value. The intermediate element is disposed between the optical element and the structural element such that thermal stress between the optical element and the structural element are transferred to the intermediate element.

14 Claims, 1 Drawing Sheet

OPTICAL ELEMENT MOUNTING TECHNIQUE

CROSS-REFERENCE TO RELATED APPLICATIONS

This patent application claims priority to U.S. Provisional Patent Application No. 60/364,637, filed Mar. 18, 2002, which is hereby incorporated by reference herein in its entirety.

FIELD OF THE INVENTION

The present invention relates generally to mounting optical elements in optical modules and, more particularly, to technique for mounting an optical element to a structural element using an intermediate element.

BACKGROUND OF THE INVENTION

When designing optical mounts for optimized thermal performance, such as is necessary in Dense Wavelength Division Multiplexing (DWDM) applications, it is critical that thermal stresses are directed to interfaces which are not damaged by these thermal stresses. For example, when bonding fused silica directly to stainless steel (i.e., optical element material to substrate material) using epoxy, it is frequently seen that the fused silica will fracture during an elevated temperature and reduced temperature bond curing cycle.

Specifically, consider the example of a glass optical element, such as an optical prism having a width of 25 millimeters, that must be mounted to a steel substrate. Assuming that the optical prism has a coefficient of thermal expansion (CTE) of $5 \times 10^{-6}$ and the steel substrate has a CTE of $10 \times 10^{-6}$, there exists a CTE difference of $5 \times 10^{-6}$ between the optical prism and the steel substrate. If the optical prism is mounted to the steel substrate directly by some means such as a thin epoxy layer at room temperature (i.e., 25° C.), then at 85° C. there will exist a expansion differential across the width of the optical prism of 7.5 microns. This expansion differential is calculated as the product of the length of the interface between the optical prism and the steel substrate (i.e., 25 mm), the CTE difference between the optical prism and the steel substrate (i.e., $5 \times 10^{-6}$), and the change in temperature (i.e., 60° C.). Since the optical prism and the steel substrate are directly bonded, this expansion differential must be taken up by additional stress in the optical prism, the steel substrate, and the epoxy. If the stress is too high, the optical prism and/or epoxy may crack, or the epoxy may delaminate. These are obviously undesirable conditions.

Various methods have been proposed for reducing or mitigating temperature-induced expansion stresses between materials having different coefficients of thermal expansion. One method is through the use of small-area interfaces where the total stress is small. However, this method typically results in less secure mountings as less area is available for such mountings. Another method is through the use of flexure designs, whereby material flexes through thermally-induced stress in a controlled manner. However, this method requires that flexures be designed into mounting surfaces.

In view of the foregoing, it would be desirable to provide a technique for mounting an optical element to a structural element which overcomes the above-described inadequacies and shortcomings in an efficient and cost effective manner.

SUMMARY OF THE INVENTION

According to the present invention, a technique for attaching an optical element to a structural element is provided. In one particular exemplary embodiment, the technique may be realized as an apparatus for attaching an optical element to a structural element. Such an apparatus may comprise an optical element formed of a material having a first coefficient of thermal expansion value, a structural element formed of a material having a second coefficient of thermal expansion value, and an intermediate element formed of a material having a third coefficient of thermal expansion value that is between the first coefficient of thermal expansion value and the second coefficient of thermal expansion value. The intermediate element is disposed between the optical element and the structural element such that thermal stress between the optical element and the structural element are transferred to the intermediate element.

In accordance with other aspects of this particular exemplary embodiment of the present invention, the size of the intermediate element may beneficially be smaller than the size of the optical element for reducing thermal stress between the intermediate element and the optical element.

In accordance with further aspects of this particular exemplary embodiment of the present invention, the yield strength of the intermediate element may beneficially be greater than the yield strength of the optical element.

In accordance with additional aspects of this particular exemplary embodiment of the present invention, the intermediate element may beneficially be secured to the optical element by an adhesive, a metal joint, and/or welding. Similarly, the intermediate element may beneficially be secured to the structural element by an adhesive, a metal joint, and/or welding. Also, the intermediate element may beneficially comprise a single material or material layer or multiple stacked materials or material layers. For example, the intermediate element may beneficially be a first intermediate element, and the apparatus may further beneficially comprise a second intermediate element formed of a material having a fourth coefficient of thermal expansion value that is between first coefficient of thermal expansion value and the second coefficient of thermal expansion value, wherein the second intermediate element is disposed between the optical element and the first intermediate element. Alternatively, the intermediate element may beneficially be a first intermediate element, and the apparatus may further beneficially comprise a second intermediate element formed of a material having a fourth coefficient of thermal expansion value that is between first coefficient of thermal expansion value and the second coefficient of thermal expansion value, wherein the second intermediate element is disposed between the structural element and the first intermediate element.

In accordance with still other aspects of this particular exemplary embodiment of the present invention, the optical element may beneficially comprise an optical lens, an optical prism, or an optical diffraction grating. Accordingly, the optical element may beneficially be formed of glass, ceramic, plastic, and/or composite material.

In accordance with still further aspects of this particular exemplary embodiment of the present invention, the structural element may beneficially be formed of a metal, ceramic, plastic, and/or composite material. Similarly, the intermediate element may beneficially be formed of a metal, ceramic, plastic, and/or composite material.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
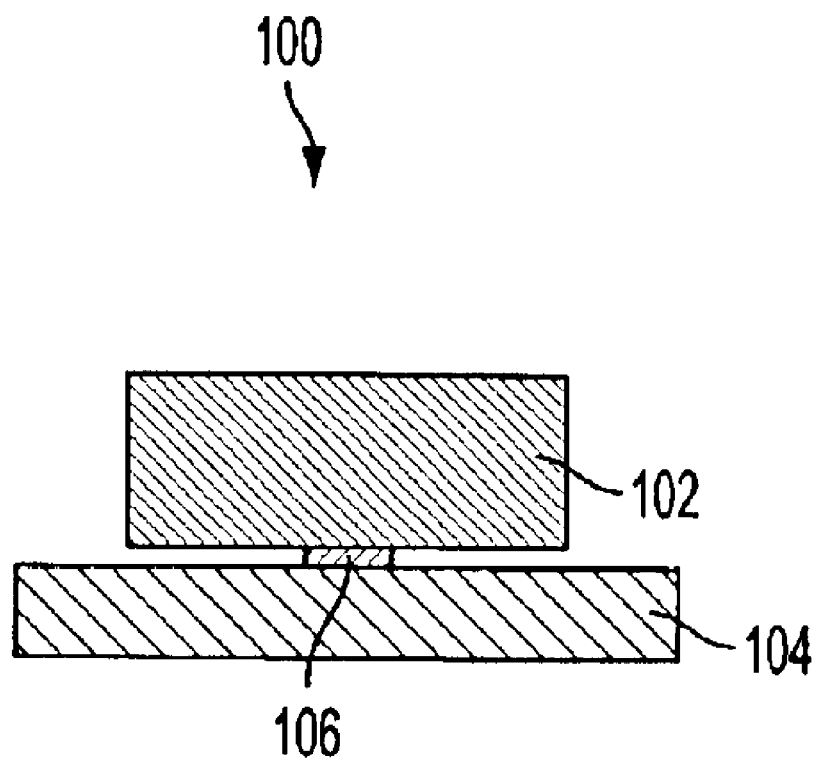
FIG. 1 shows a side view of an optical element mounting arrangement wherein thermally-induced stresses between an optical element and a structural element are reduced using an intermediate element in accordance with the present invention.

Referring to FIG. 1, there is shown a side view of an optical element mounting arrangement 100 wherein an optical element 102 is mounted to a structural element 104 using an intermediate element 106 in accordance with the present invention. The optical element 102 may be one of any number of optical-type components such as, for example, an optical lens, an optical prism, an optical diffraction grating, and an optical detector. However, for purposes of this description, assume that the optical element 102 is an optical lens formed of fused silica having a coefficient of thermal expansion (CTE) of $0.5 \times 10^{-6}$.

The structural element 104 may be one of any number of optical element support-type structures such as, for example, an optical element mounting platform for a Dense Wavelength Division Multiplexer (DWDM) module or an Optical Performance Monitor (OPM) module. However, for purposes of this description, assume that the structural element 104 is an optical element support platform formed of stainless steel having a coefficient of thermal expansion (CTE) of $10 \times 10^{-6}$.

The intermediate element 106 is positioned between the optical element 102 and the structural element 104 so as to eliminate, or at least reduce, the deleterious effects of thermally-induced stresses at a bi-material interface in accordance with the present invention. The intermediate element 106 may be formed of any number of material types having a coefficient of thermal expansion (CTE) with a value that is in between that of the optical element 102 and the structural element 104. For example, assume for purposes of this description that the intermediate element 106 is formed of Invar™ having a CTE of $1.0 \times 10^{-6}$, which is clearly between the above-mentioned CTE of the optical element 102 (i.e., formed of fused silica having a CTE of $0.5 \times 10^{-6}$) and the CTE of the structural element 104 (i.e., formed of stainless steel having a CTE of $10 \times 10^{-6}$)

The intermediate element 106 may be secured to the optical element 102 and the structural element 104 by various means such as, for example, an adhesive (e.g., epoxy), a metal joint (e.g., solder), or welding (e.g., laser welding). By securing the intermediate element 106 in between the optical element 102 and the structural element 104, thermally-induced stresses resulting from the difference in the coefficients of thermal expansion of the optical element 102 and the structural element 104 are no longer directly absorbed by the optical element 102 and/or by any bonding material or configuration that may located or formed, respectively, between the optical element 102 and the structural element 104. Instead, the intermediate element 106 absorbs such thermally-induced stresses, thereby preventing damage to the optical element 102 and/or any bonding material or configuration that may be located or formed, respectively, at the interfaces between the optical element 102, the intermediate element 106, and the structural element 104.

Another feature of the present invention that is shown in the optical element mounting arrangement 100 of FIG. 1 includes reducing the size of the intermediate element 106 relative to the size of the optical element 102. This feature may further reduce the amount of thermally-induced stress seen by the optical element 102.

At this point it should be noted that the intermediate element 106 may comprise more than one material or layer of material. For example, the intermediate element 106 may comprise multiple materials or material layers (i.e., multiple intermediate elements 106) stacked over each other and positioned between the optical element 102 and the structural element 104 to achieve all of the same benefits described above.

At this point it should be noted that it is generally preferred to form the intermediate element 106 using a material having yield strength that is greater than that of the material from which the optical element 102 is formed. This feature acts to prevent fractures or mechanical failures of the optical element 102 due to any thermally-induced stresses that the optical element 102 may absorb.

In summary, the present invention addresses the problem of attaching components having different rates of thermal expansion in an optical system. The optical system may be, for example, a Dense Wavelength Division Multiplexer (DWDM) module or an Optical Performance Monitor (OPM) module. These types of modules are typically used in telecommunications applications, and are typically required to function and survive over wide temperature ranges (e.g., −40° C. to 85° C.). Thus, the attachment method used to attach components within these modules must allow for stresses and movements caused by differential thermal expansion between the components. The components include, but are not limited to, optical elements such as optical lenses, optical prisms, optical gratings, and optical detectors. These components may be attached to each other or more typically to an opto-mechanical support such as, for example, a platform or barrel. Thus, the present invention comprises a technique for attaching components having different rates of thermal expansion in an optical system, whereby thermal stress between the components is transferred to an intermediate element.

The present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes.

What is claimed is:

1. An apparatus for attaching an optical element to a structural element, the apparatus comprising:

an optical element formed of a material having a first coefficient of thermal expansion value;

a structural element formed of a material having a second coefficient of thermal expansion value; and an intermediate element comprising multiple stacked material layers formed of a material having a third coefficient of thermal expansion value that is between the first coefficient of thermal expansion value and the second coefficient of thermal expansion value, the intermediate element being disposed between the optical element and the structural element such that thermal stresses between the optical element and the structural element are transferred to the intermediate element.

2. The apparatus as defined in claim 1, wherein the size of the intermediate element is smaller than the size of the optical element for reducing thermal stress between the intermediate element and the optical element.

3. The apparatus as defined in claim 1, wherein the yield strength of the intermediate element is greater than the yield strength of the optical element.

4. The apparatus as defined in claim 1, wherein the intermediate element is secured to the optical element by one or more of an adhesive, a metal joint, and welding.

5. The apparatus as defined in claim 1, wherein the intermediate element is secured to the structural element by one or more of an adhesive, a metal joint, and welding.

6. The apparatus as defined in claim 1, wherein the structural element is formed of one or more of a metal, ceramic, plastic and composite material.

7. The apparatus as defined in claim 1, wherein the intermediate element is formed of one or more of a metal, ceramic, plastic, and composite material.

8. The apparatus as defined in claim 1, wherein the intermediate element comprises a single material.

9. The apparatus as defined in claim 1, wherein the intermediate element comprises multiple stacked materials.

10. The apparatus as defined in claim 1, wherein the intermediate element is a first intermediate element, further comprising:

a second intermediate element formed of a material having a fourth coefficient of thermal expansion value that is between first coefficient of thermal expansion value and the second coefficient of thermal expansion value, the second intermediate element being disposed between the optical element and the first intermediate element.

11. The apparatus as defined in claim 1, wherein the intermediate element is a first intermediate element, further comprising:

a second intermediate element formed of a material having a fourth coefficient of thermal expansion value that is between first coefficient of thermal expansion value and the second coefficient of thermal expansion value, the second intermediate element being disposed between the structural element and the first intermediate element.

12. The apparatus as defined in claim 1, wherein the optical element comprises one of an optical lens, an optical prism, and an optical diffraction grating.

13. The apparatus as defined in claim 1, wherein the optical element is formed of one or more of glass, ceramic, plastic, and composite material.

14. An apparatus for attaching an optical element to a structural element, the apparatus comprising:

an optical element formed of a material having a first coefficient of thermal expansion value;

a structural element formed of a material having a second coefficient of thermal expansion value;

a first intermediate element formed of a material having a third coefficient of thermal expansion value that is between the first coefficient of thermal expansion value and the second coefficient of thermal expansion value, the first intermediate element being disposed adjacent the optical element; and a second intermediate element formed of a material having a fourth coefficient of thermal expansion value that is between the first coefficient of thermal expansion value and the second coefficient of thermal expansion value the second intermediate element being disposed between the first intermediate element and the structural element;

such that thermal stresses between the optical element and the structural element are absorbed by the first and second intermediate elements.

* * * * *